United States Patent
Lundgren et al.

(10) Patent No.: US 7,200,933 B2
(45) Date of Patent: Apr. 10, 2007

(54) METHOD FOR MANUFACTURING A STATOR COMPONENT

(75) Inventors: Jan Lundgren, Grundsund (SE); Mats Hallqvist, Grästorp (SE)

(73) Assignee: Volvo Aero Corporation, Trolhattan (SE)

( * ) Notice: Subject to any disclaimer, the term of this patent is extended or adjusted under 35 U.S.C. 154(b) by 0 days.

(21) Appl. No.: 10/604,758

(22) Filed: Aug. 14, 2003

(65) Prior Publication Data
US 2004/0103534 A1    Jun. 3, 2004

Related U.S. Application Data

(60) Provisional application No. 60/402,947, filed on Aug. 14, 2002.

(51) Int. Cl.
*B21K 25/00* (2006.01)
(52) U.S. Cl. .................... 29/889.22; 29/889.2

(58) Field of Classification Search ............. 29/889.22, 29/889.2, 889.21, 889, 889.23, 890.01, 596, 29/592.1; 310/259, 164
See application file for complete search history.

(56) References Cited

U.S. PATENT DOCUMENTS

2003/0223872 A1* 12/2003 Frolov et al. ............... 416/191

* cited by examiner

*Primary Examiner*—John C. Hong
(74) *Attorney, Agent, or Firm*—Novak Druce + Quigg, LLP

(57) ABSTRACT

Method and arrangement for providing a stator component intended during operation to conduct a gas flow. The component is made up of at least two sections (113) in its circumferential direction, which sections each have at least one wall part (101, 102). The sections are placed adjacent to each other and two wall parts, one from each of two adjacent sections, are connected in order together to form a means, extending in the radial direction of the component, for guidance of the gas flow and/or transmission of load during operation of the component.

18 Claims, 9 Drawing Sheets

METHOD FOR MANUFACTURING A STATOR COMPONENT

CROSS REFERENCE TO RELATED APPLICATIONS

The present application claims the benefit of U.S. Provisional Application No. 60/402,947 filed 14 Aug. 2002. Said application is expressly incorporated herein by reference in its entirety.

BACKGROUND OF INVENTION

1. Field of the Invention

The present invention relates to a method for manufacturing a stator component that is intended during operation to conduct a gas flow. The stator component can, for example, be used in a gas turbine and especially in a jet engine.

As used herein, jet engine is meant to include various types of engines that admit air at relatively low velocity, heat it by combustion and shoot it out at a much higher velocity. Included within the term jet engine are, for example, turbojet engines and turbo-fan engines.

A component of this kind, comprising (including, but not limited to) an outer and an inner ring with wall parts configured between the rings, can be arranged with a view to primarily being force-transmitting in the radial and axial direction. The wall parts can, for example, form hollow blades, which are usually shaped such that they offer as little air resistance as possible. The component can, for example, be arranged in a rear or front stand, or in an intermediate housing in a jet engine. The blades are often referred to in such a case as stays or "struts". Struts can, however, also be formed by other types of parts than hollow blades.

2. Background Art

Wall parts in the form of hollow blades are known that are arranged at a distance apart in the circumferential direction of the carrying component between an inner and an outer ring. The hollow blades are joined together with the rings by welding. Each of the rings is made in this case firstly with portions of the same cross-dimensional shape and size as the blades, protruding in the radial direction. Such protruding portions are often referred to as "stubs." Each of the blades is then welded to a protruding portion of this kind by means of a butt joint. The radially protruding portions are usually mill-cut from a ring. This is a time-consuming and costly operation.

SUMMARY OF INVENTION

One objective of the present invention is to achieve a method for manufacturing a stator component that creates or establishes preconditions for a more high-strength component than previously available, and with a longer working life. Further, a more time-effective and cost-effective manufacture is enabled.

This objective is achieved by virtue of the fact that the component is made up of at least two sections in its circumferential direction, which sections each have at least one wall part. The sections are placed adjacent to each other and two wall parts, one from each of two adjacent sections, are connected together in order to form a means, extending in the radial direction of the component, for guidance of gas flows and/or transmission of load during operation of the component. The gas-flow-guidance or load-transmission means are thus made up of two separate wall parts, one from each section. This means will thus delimit adjoining gas ducts in the circumferential direction. The gas ducts thus extend in the axial direction of the component.

According to a preferred embodiment of the invention, a first of the adjacent sections is constructed by a first wall part and a second wall part being spaced apart so as to define a gas duct between them in the circumferential direction.

According to a refinement of the previous embodiment, a third wall part is arranged such that it extends between the first and second wall part and is connected thereto so as to define the gas duct in a first direction in the radial direction of the component. This produces a structurally strong construction, with the third wall part also acting as a stiffening means and spacer.

According to an additional refinement of the previous embodiment, the edge of the third wall part is laser-welded to the first and second wall part from an, in the circumferential direction, opposite side of the same in relation to the third wall part in such a way that the joined-together portions of the wall parts form a T-shaped joint.

By the edge of the wall part, the elongated surface that delimits the side faces, or flat sides, of the wall part is meant. Given an appropriate choice of material parameters and welding parameters, a T-shaped joint with rounded corners, or at least a relatively smooth transition can be obtained between the wall parts. This produces a structurally strong construction and hence an extended working life. Alternatively, a construction with thinner wall thicknesses and hence reduced weight can be obtained.

According to another preferred embodiment, the first and second wall part form portions of an essentially U-shaped single element.

Further preferred embodiments of, and advantages with, the invention can be ascertained from the claims, drawings, and following description.

BRIEF DESCRIPTION OF DRAWINGS

The invention will be described in greater detail below, with reference to the embodiments shown in the appended drawings, in which.

DETAILED DESCRIPTION

Figure 1:
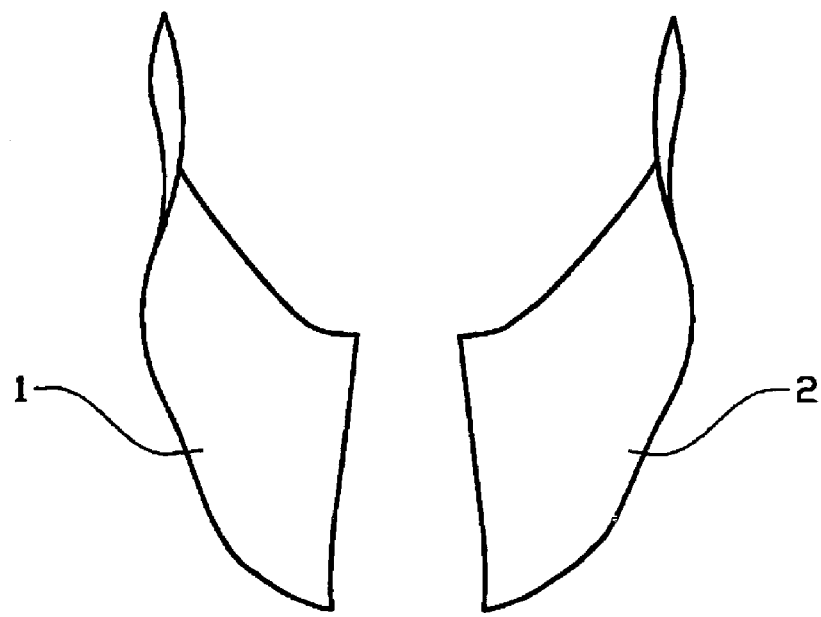
FIGS. 1–5 show, in projections, different steps in the manufacture of a component configured according to a first embodiment of the present invention.
Figure 2:
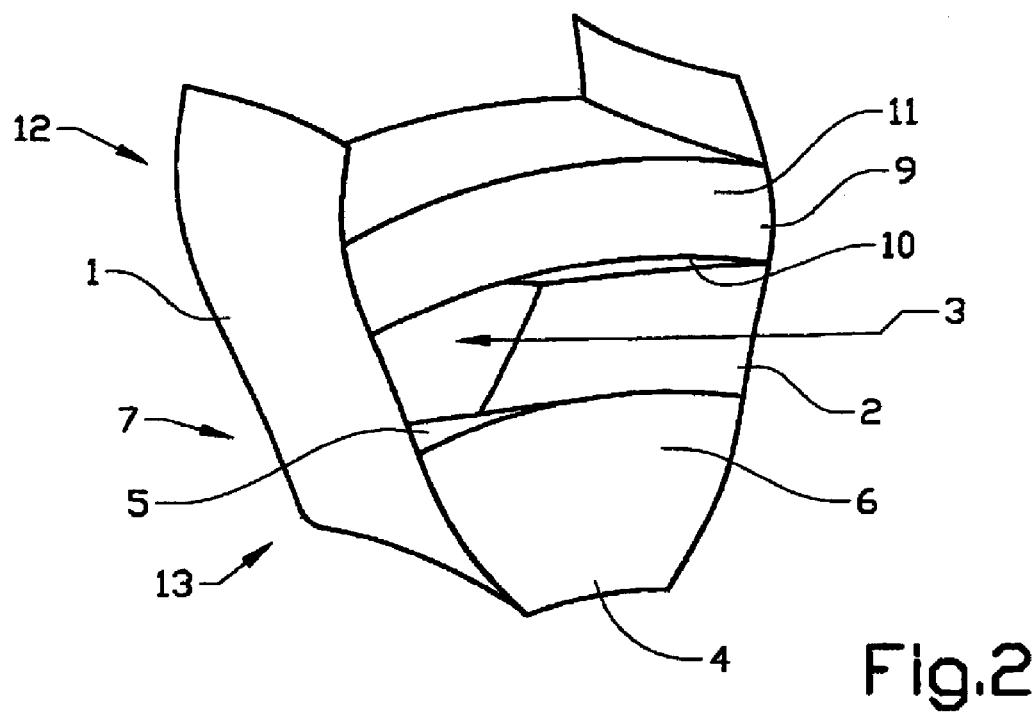

FIGS. 1 and 2 show a first wall part 1 and a second wall part 2, which are intended to form part of a first section 13 (see FIG. 3) of a stator component configured according to a first embodiment of the present invention. The wall parts 1, 2 have an essentially identical, curved shape and are spaced at a distance apart such that concave sides face each other. In other words, the wall parts 1, 2 represent in FIG. 1 a mirror image of each other. The wall parts can, however, also have a mutually different configuration. The wall parts 1, 2 are arranged so as to define a gas duct 3 between them in the circumferential direction of the component, as shown in FIG. 2.

A first plate-shaped member 4, having a shape corresponding to the space between the first and second wall part 1, 2, is then placed between these (see FIG. 2). The plate-shaped member 4 has a U-shaped cross section and is constituted, for example, by a bent, or folded plate. An intermediate portion 5 of the plate-shaped member 4 forms a third wall part, which limits the gas duct 3 inwardly in the radial direction. The sides or plate portions 6, 7 of the plate-shaped member 4 have a shape and size corresponding to the space between the first and second wall part 1, 2. The flat sides of the side or plate portions 6, 7 thus face in the axial direction.

Figure 12:
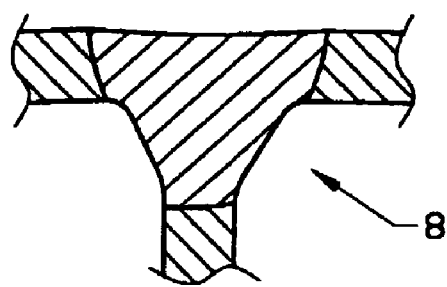
FIG. 12 shows a cross section of a laser-welded joint in an exemplary component.

The third wall part 5 is connected to the first and second wall part 1, 2 by the edge of the third wall part 5 being laser-welded to the flat side of the first and second wall part 1, 2 from an opposite side of the same in relation to the third wall part in such a way that the joined-together portions of the wall parts form a T-shaped joint 8 (see FIG. 12). The side portions 6, 7 of the plate-shaped member 4 are also connected to the first and second wall parts 1, 2, expediently by laser-welding. Further, the side portions 6, 7 and the third wall part 5 are connected to the first and second wall part by a continuous weld.

Further, a second plate-shaped member 9 having a shape corresponding to the space between the first and second wall part 1, 2 is placed therebetween (see FIG. 2). The plate-shaped member 9 has a square cross section and is constituted, for example, by a bent, welded-together plate. A portion 10 of the plate-shaped member 9 forms a fourth wall part that limits the gas duct 3 outwardly in the radial direction. The side or plate portions 11, 12 of the second plate-shaped member 9 have a shape and size corresponding to the space between the first and second wall part 1, 2. The flat sides of the side or plate portions 11, 12 thus face in the axial direction.

The fourth wall part 10 is connected to the first and second wall part 1, 2 by the edge of the fourth wall part 10 being laser-welded to the flat side of the first and second wall part 1, 2 from an opposite side of the same in relation to the third wall part in such a way that the joined-together portions of the wall parts form a T-shaped joint 8 (see FIG. 12). The side portions 11, 12 of the plate-shaped member 9, too, are connected to the first and second wall part 1, 2, expediently by laser-welding.

Figure 3:
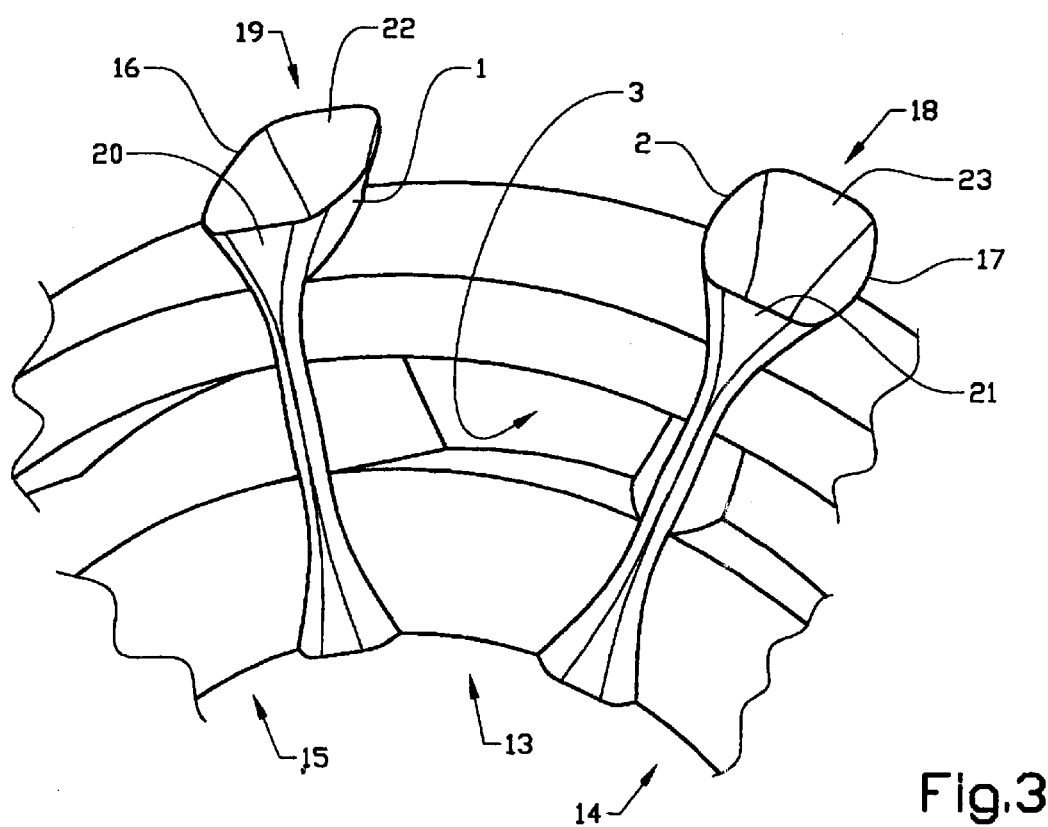

A plurality of identically configured sections 13, 14, 15, made according to the description above, are then arranged side by side (see FIG. 3). The first and second wall parts 1, 2 of the first section 13 are connected to a corresponding wall part 16, 17 of the sections 14, 15 adjoining in the circumferential direction. The mutually connected wall parts 1, 16, 2, 17 together form means 18, 19 for guidance of a gas flow and/or transmission of load in the radial direction during operation of the component. The adjoining wall parts 1, 16, 2, 17 are connected in FIG. 3 by two cover walls 20, 21, 22, 23, which thus enclose a space between the wall parts.

The wall parts 1, 2 thus extend substantially in the radial direction of the component. In addition, they have an extent substantially in the axial direction of the component.

Figure 4:
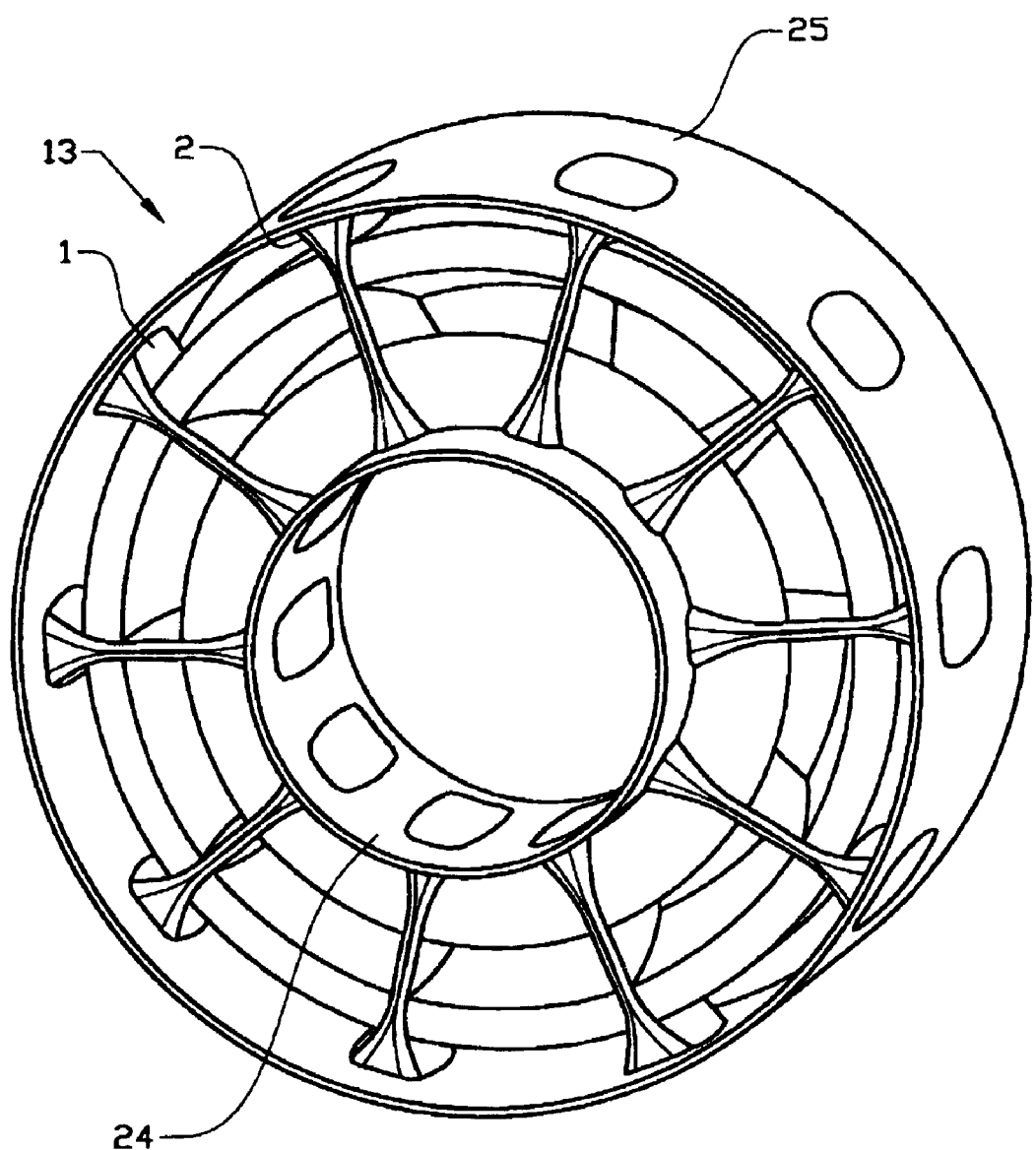

A ring element 24 is then arranged radially inside the first and second wall parts 1, 2 and is connected thereto (see FIG. 4). Correspondingly, a ring element 25 is arranged radially outside the first and second wall part 1, 2 and is connected thereto. The ring elements 24, 25 are constituted by plate-shaped bands that are continuous in the circumferential direction of the component. The respective ring elements 24, 25 are connected to the wall parts 1, 2 by the ring-elements-facing edge of the wall parts 1, 2 being laser-welded to the flat side of the ring elements from an opposite side of these in relation to the wall parts in such a way that the joined-together portions form a T-shaped joint 8 (see FIG. 12). In other words, laser-welding is performed from the inside of the inner ring outwardly in the radial direction and from the outside of the outer ring inwardly in the radial direction.

A hole 27 is then cut out through the outer ring element 25 between each section or, in other words, at the positions for the spaces between two adjoining wall parts. These holes 27 can now be used to house various means for feeding of the component, such as means for the intake and outtake of oil and/or air, for housing instruments, such as electrical and metallic cables for transfer of information concerning measured pressure and/or temperature. The holes 27 can also be used to conduct coolant. Further, on each side of the component in the axial direction, a circular-shaped flange, or stiffening rib 28, is arranged that bears against the wall parts 1, 2 (see FIG. 5).

Figure 5:
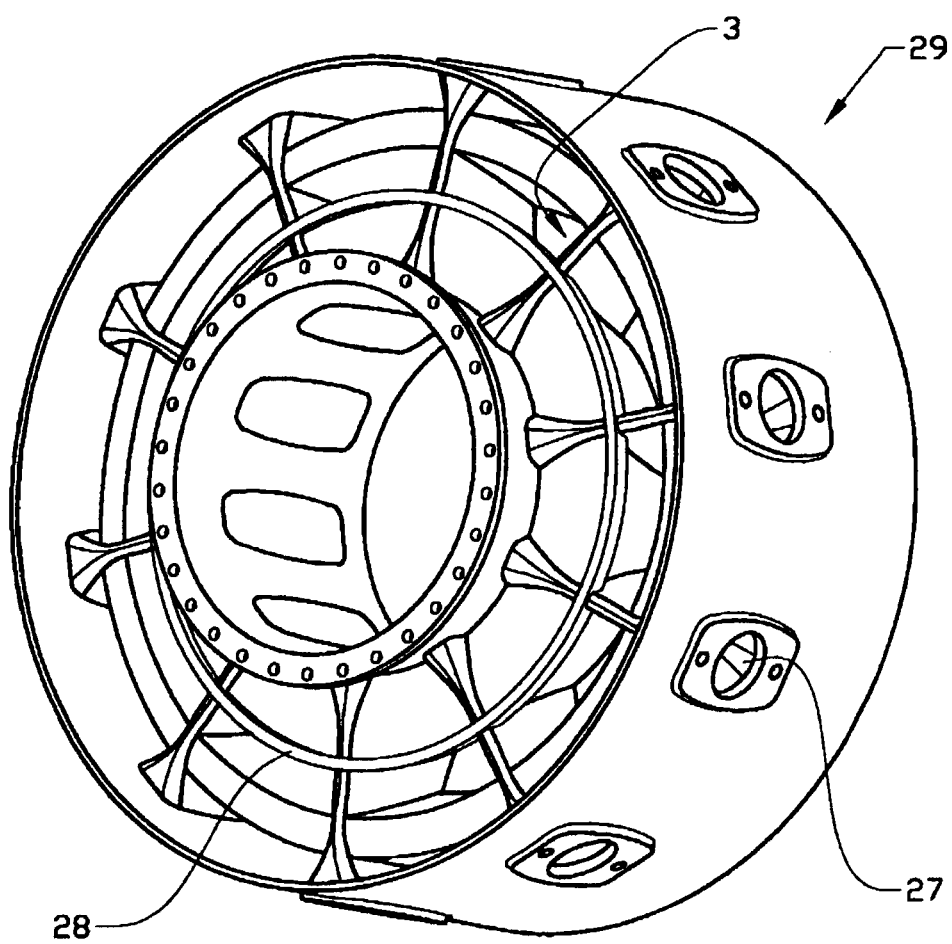
Figure 6:
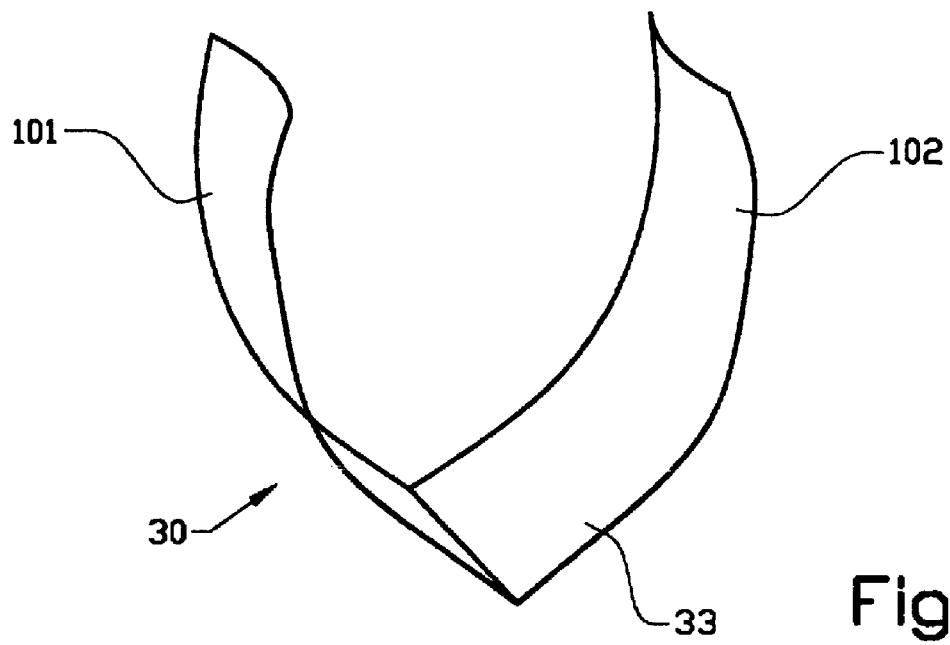
FIGS. 6–11 show, in projections, different steps in the manufacture of a component configured according to a second embodiment of the present invention.

FIG. 5 shows a stator component 29 made according to a first preferred embodiment of the invention. The gas ducts 3 thus extend in the axial direction of the component. The stator component 29 can, for example, form a load-bearing structure between bearings arranged radially/axially on the inside, and structures connected on the outside.

In FIGS. 6–11, an alternative, second embodiment of the invention is shown. Only basic differences relative to the above-described first embodiment will be described below. A first wall part 101 and a second wall part 102 form portions of an essentially U-shaped single element 30 (see FIG. 6). The two wall parts 101, 102 are thus integrated into one element. Each of the two wall parts 101, 102 thus forms a portion of the side members of the U-shaped element 30. The U-shaped element 30 further has a base 33, which connects the two side members.

Figure 7:
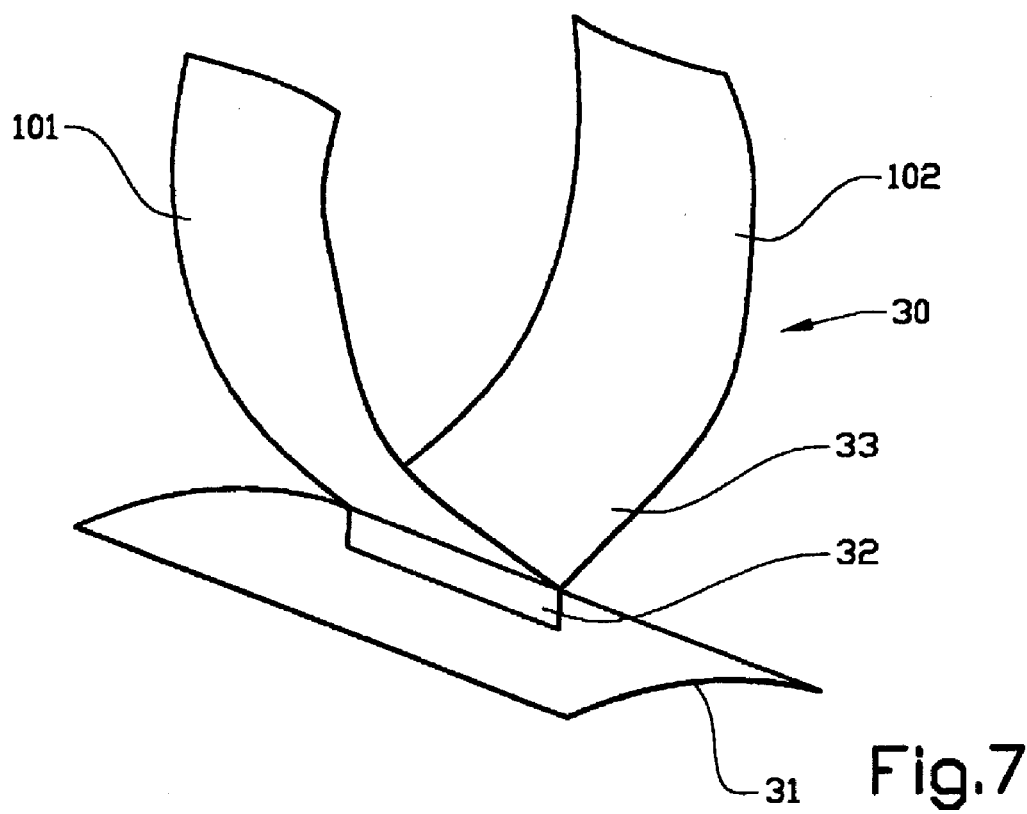

The base 33 of the U-shaped element 30 is connected to a ring element 31 that only forms part of a ring (see FIG. 7). The ring element 31 has for this purpose a protruding rib 32, which extends in the intended axial direction of the component. The base 33 has a pointed shape and the pointed portion is connected to the rib 32, for example, by welding. In other words, each section has a separate inner ring element 31.

Figure 8:
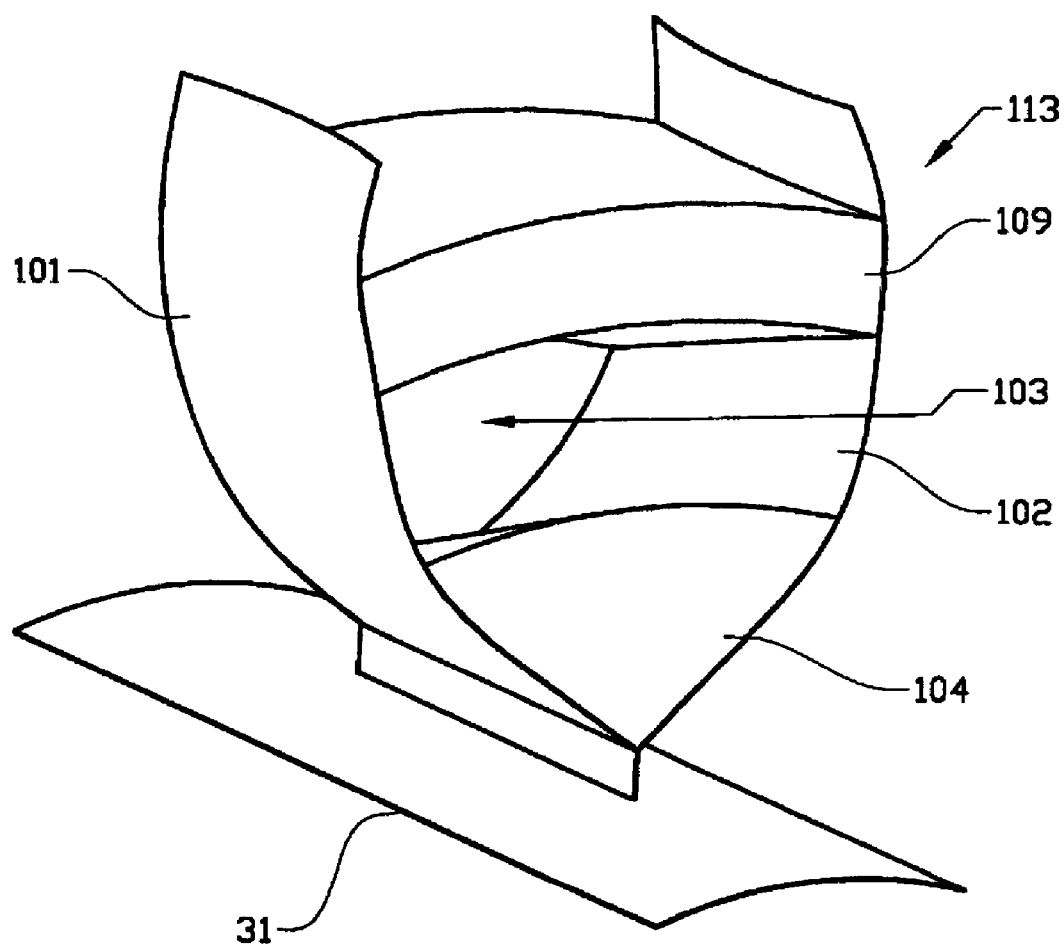

A first and second plate-shaped member 104, 109, which each have a shape corresponding to the space between the first and second wall part 101, 102, are then placed there between in the same manner as described above regarding the first embodiment (see FIG. 8). Each of the plate-shaped members 104, 109 comprises a wall part that limits the gas duct 103 inwardly in the radial direction. In FIG. 8, a section 113 is therefore shown.

Figure 9:
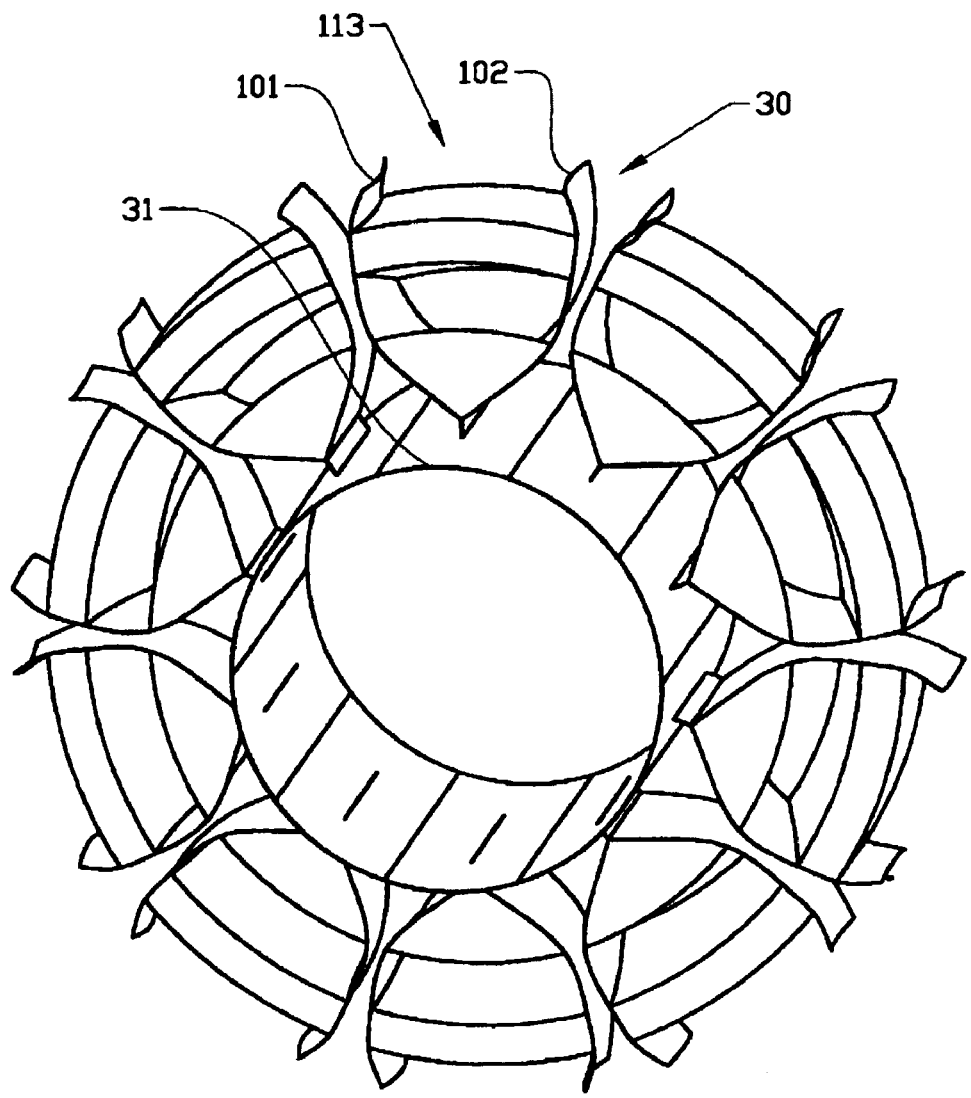

In FIG. 9, a plurality of the sections has been joined together in the circumferential direction. More precisely, it is the ring element 31 of each section that has been joined together with the ring elements of adjacent sections. The joining-together can be realized, for example, by welding.

Figure 10:
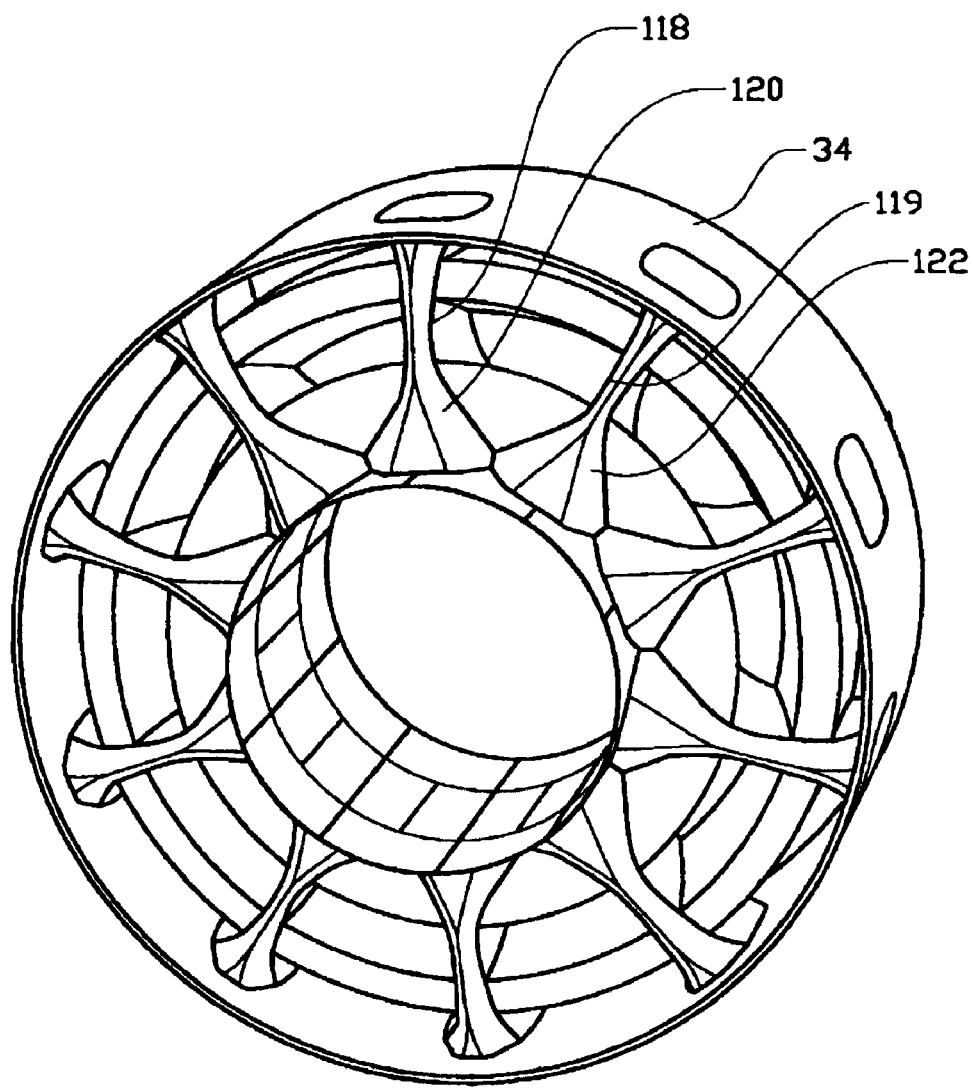

Cover walls 120, 122 are arranged between the wall parts of two adjoining sections and are connected to the wall parts (see FIG. 10). The mutually connected wall parts together form means 118, 119 for guidance of a gas flow and/or transmission of load in the radial direction during operation of the component. In FIG. 10, an outer ring 34 has further been arranged outside the wall parts in the radial direction.

Figure 11:
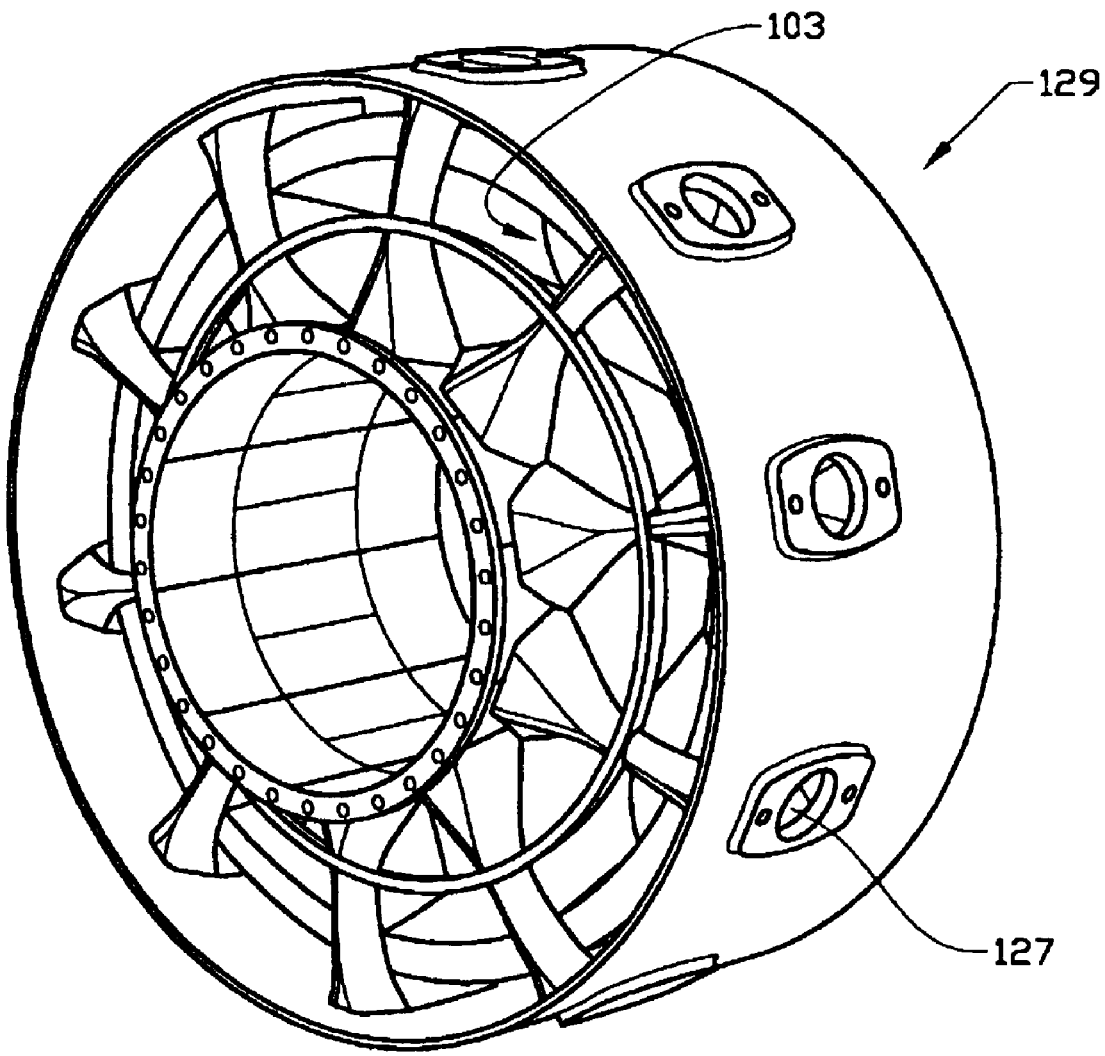

Holes 127 are then cut out through the outer ring 34 between each section or, in other words, at the positions for the spaces between two adjoining wall parts, see FIG. 11.

FIG. 11 shows a stator component 129 made according to a second preferred embodiment of the invention. The gas ducts 103 thus extend in the axial direction of the component. The stator component 129 can, for example, form a load-bearing structure between bearings arranged radially on the inside, and a housing arranged radially on the outside.

FIG. 12 illustrates the above-described T-shaped weld joint 8. By T-joint 8, it is meant that a portion of one of the wall parts and the ring elements, respectively, form the top part of the T and a portion of a second one of the wall parts forms the vertical part of the T, which connects to the top part.

By the plate-shaped members 4, 9, 104, 109, it is meant that at least one portion has a plate-shape. The plate-shaped member can thus form the shape of a tube, a profile, etc. In other words, the plate-shaped members can be made from a disk or a plate, which is cut and folded into the desired shape, but other manufacturing techniques are also conceivable, such as crosscutting of tubes, or profiles having the desired cross-sectional shape.

The materials used for the wall parts, which are intended to be welded, are constituted by weldable materials such as stainless steel, for example of the type 347 or A286. Alternatively, nickel-based alloys, such as, for example, INCO600, INCO625, INCO718 and Hastaloy x, can be used. According to further variants, cobalt-based alloys, for example, of the type HAYNES 188 and HAYNES 230, can be used. Further, titanium alloys, such as Ti6-4, Ti6-2-4-2 and various types of aluminum alloys can be used. Further combinations of different materials are also possible.

In the laser-welding, a Nd:YAG-laser is preferably used, but also other types of welding arrangements, for example a $CO_2$-laser, can be used according to the invention. By precise coordination of the welding method, materials choice and wall part dimensions, the T-shape in respect of a particular joint and a relatively gently rounded shape 22 of the inner angle between the wall parts are obtained with the laser-welding (see FIG. 12). The welding is expediently realized by means of a continuous weld. The rounded shape of the weld joints produces a high-strength construction and hence long working life for the component. This type of joining-together creates preconditions for a complete melting of the weld joint and fine transitions between the parts.

In order for the weld joint to end up in exactly the right position, a previously known joint-following technique can be used. Preferably a continuous weld joint is applied.

Each of the wall parts has the shape of a plate. By plate-shape, it is meant that the wall part has two parallel side faces at a relatively short distance apart. Plate-shape is further meant to cover both the possibility of the wall part extending in one plane and of having a rounded or curved shape.

Should the wall parts have the purpose of being load-transmitting or load-bearing in the radial direction, that is to say when they form so-called struts or stays, an airfoil shape is not always required, nor the shape of hollow blades, but rather the plate-shape can suffice. A plurality of different configurations are, however, possible.

Should the second wall parts have the purpose of guiding a gas flow during operation of the component, the mutually connected second wall parts form the shape of a blade, for example, having an airfoil shape in cross section. Such a blade shape is utilized when the component is used in specific stator applications.

By use of the term ring element, a continuously annular member, a substantially annular member interrupted in the circumferential direction, or a part that, together with other like parts, is intended to form an annular member is meant. When a plurality of such ring elements are joined together in the circumferential direction, a ring is formed. Ring is used to mean a circumferential, band-shaped, preferably circular part that spreads like a plate in the axial direction.

By the expression that the wall part extends in a certain direction with respect to the component, it is meant that at least one component of the extent of the wall part lies in this direction. Preferably, the wall part extends substantially in this direction. In other words, the wall part in question extends in a plane parallel with the direction.

The stator component can, for example, form an inlet part, an intermediate housing, or a turbine-exhaust housing; by exhaust housing, a concluding housing part, or part thereof for a gas turbine is meant. Its primary function in this case is to act as a bearing fastening, for the transmission of loads, and to provide a duct for gases.

The invention will not be deemed limited to the illustrative embodiments described above, but a host of further variants and modifications are conceivable while still being within the scope of the following patent claims.

According to one alternative, the second plate-shaped member 9 is made by crosscutting a tube of square-shaped cross section.

The connection of a radially extending wall part of one to a radially extending wall part of an adjacent section can further be affected differently than arranging a cover plate therebetween. For example, the wall parts can be arranged relatively close together and connected by the application of material, or by welding, etc. Further, the cover plates can be fixed in a number of different ways, such as riveting and gluing.

The mutual connection of two wall parts which are intended to define a gas duct, that is to say the connection of a wall part extending in the radial direction to a wall part extending in the circumferential direction, can be effected using a technique other than laser-welding, for example by soldering or other suitable type of welding.

The manufacture of the wall parts can be effected in a number of different ways, for example by heat-forming and then cutting by laser, water jet or otherwise into the intended shape.

In the description above, each section is provided with two wall parts. It lies within the scope of the invention, however, for each section to have a different number of wall parts. According to one example, one section has three wall parts, which thus defines two ducts. Further, not necessarily all the sections in a component are identically configured, but rather different sections in the same component can have different numbers of wall parts.

Still further in certain constructions, the outer ring element 25 is not required.

The invention claimed is:

1. A method for manufacturing a stator component (29, 129) which is intended during operation to conduct a gas flow, said method comprising:
   providing a stator component (29, 129) made up of at least two sections (13, 14, 15; 113) in its circumferential direction, which sections each have at least one wall part (1, 2; 101, 102); and
   orienting the sections adjacent to each other and interconnecting the two wall parts, one from each of two adjacent sections, in order together to form a means (18, 19; 118, 119) extending in the radial direction of the component, for guidance of the gas flow and/or transmission of load during operation of the component.

2. The method as recited in claim 1, wherein a first of the adjacent sections (13; 113) is constructed by a first wall part (1; 101) and a second wall part (2; 102) is spaced apart so as to define a gas duct (3; 103) between them in the circumferential direction.

3. The method as recited in claim 2, wherein the first and second wall parts (1, 2; 101, 102) are mutually arranged such that, in the component, they at least partially extend essentially in the radial direction of the component.

4. The method as recited in claim 2, wherein a third wall part (5) extends between the first and second wall part and is connected thereto thereby defining the gas duct in a first direction in the radial direction of the component.

5. The method as recited in claim 4, wherein the edge of the third wall part (5) is laser-welded to the first and second wall part (1, 2) from an, in the circumferential direction, opposite side of the same in relation to the third wall part in such a way that the joined-together portions of the wall parts form a T-shaped joint (8).

6. The method as recited in claim 4, wherein the third wall part (5) constitutes an intermediate portion of a first plate-shaped member (4), which has a shape corresponding to the space between the first and second wall part, and in that this plate-shaped member is placed between the first and second wall part.

7. The method as recited in claim 4, wherein a fourth wall part (10) is arranged such that it extends between the first and second wall part (1, 2) and is connected thereto so as to define the gas duct in a second direction in the radial direction of the component.

8. The method as recited in claim 7, wherein the edge of the fourth wall part (10) is laser-welded to the first and second wall part from an, in the circumferential direction, opposite side of the same in relation to the fourth wall part in such a way that the joined-together portions of the wall parts form a T-shaped joint (8).

9. The method as recited in claim 7, wherein the fourth wall part (10) constitutes an intermediate portion of a second plate-shaped member (9), which has a shape corresponding to the space between the first and second wall part, and in that this plate-shaped member is placed between the first and second wall part.

10. The method as recited in claim 2, wherein the first and second wall part (1, 2; 101, 102) are connected to an, in the radial direction, inner and/or outer ring element (24, 25; 31, 34).

11. The method as recited in claim 10, wherein the base (33) of the U-shaped element (30) is connected to the inner ring element (31).

12. The method as recited in claim 10, wherein the side members of the U-shaped element (30) are connected to the outer ring element (34).

13. The method as recited in claim 2, wherein the first and second wall part (101, 102) form portions of an essentially U-shaped single element (30).

14. The method as recited in claim 2, wherein all sections are constructed in the same manner as the first section.

15. The method as recited in claim 1, wherein the stator component (29, 129) has an essentially circular cross-sectional shape and in that a plurality of ducts for conduction of the gas flow extend in the axial direction between an inner and an outer ring.

16. The method as recited in claim 1, wherein the stator component (29, 129) is intended for a gas turbine.

17. The method as recited in claim 1, wherein the stator component (29, 129) is intended for a jet engine.

18. A method for manufacturing a stator component (29, 129) which is intended during operation to conduct a gas flow, said method comprising:

providing a stator component (29, 129) made up of at least two sections (13, 14, 15; 113) in its circumferential direction, which sections each have at least one wall part (1, 2; 101, 102); and orienting the sections adjacent to each other and interconnecting the two wall parts, one from each of two adjacent sections, in order together to form a means (18, 19; 118, 119) extending in the radial direction of the component, for guidance of the gas flow and/or transmission of load during operation of the component, wherein a first of the adjacent sections (13; 113) is constructed by a first wall part (1; 101) and a second wall part (2; 102) spaced apart so as to define a gas duct (3; 103) between them in the circumferential direction, the stator component having a third wall part (5) extending between the first and second wall part and connected thereto to define the gas duct in a first direction in the radial direction of the component, wherein an edge of the third wall part (5) is laser-welded to the first and second wall part (1, 2) from an, in the circumferential direction, opposite side of the same in relation to the third wall part in such a way that the joined-together portions of the wall parts form a T-shaped joint (8).

* * * * *